(12) United States Patent
Triebes et al.

(10) Patent No.: US 7,532,819 B1
(45) Date of Patent: May 12, 2009

(54) REFRACTIVE MULTI-BEAM LASER COMMUNICATIONS TERMINAL

(75) Inventors: Kenneth J. Triebes, Rancho Palos Verdes, CA (US); John Chilese, Cupertino, CA (US); Larry H. Capots, Mountain View, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 1182 days.

(21) Appl. No.: 10/778,641

(22) Filed: Feb. 12, 2004

Related U.S. Application Data

(60) Provisional application No. 60/447,245, filed on Feb. 12, 2003.

(51) Int. Cl.
*H04B 10/00* (2006.01)
(52) U.S. Cl. ..................................................... 398/121
(58) Field of Classification Search ......... 398/118–131; 359/849–850, 856, 857, 861, 862, 872
See application file for complete search history.

(56) References Cited

U.S. PATENT DOCUMENTS

| | | | | | |
|---|---|---|---|---|---|
| 4,933,928 | A | * | 6/1990 | Grant et al. | 398/121 |
| 5,517,016 | A | * | 5/1996 | Lesh et al. | 250/201.1 |
| 5,631,770 | A | * | 5/1997 | Jarmuz | 359/351 |
| 6,829,069 | B2 | * | 12/2004 | Buzzetta | 359/224 |

* cited by examiner

*Primary Examiner*—Quan-Zhen Wang
(74) *Attorney, Agent, or Firm*—McDermott Will & Emery LLP

(57) ABSTRACT

A communication terminal including a steering module including a plurality of articulating-turning mirrors configured to selectively direct a corresponding plurality of sets of transmitted beams to sets of listeners; a plurality of static turning mirrors optically coupled to the articulating-turning mirrors, wherein the articulating-turning mirrors are respectively associated with the static turning mirrors; and a refractive common optic optically coupled to the static-turning mirrors; and an optical module including a plurality of transmitter-receiver modules optically coupled to the refractive common optic.

37 Claims, 9 Drawing Sheets

REFRACTIVE MULTI-BEAM LASER COMMUNICATIONS TERMINAL

CROSS-REFERENCES TO RELATED APPLICATIONS

This application claims priority to U.S. Provisional Patent Application No. 60/447,245, filed Feb. 12, 2003, titled "Refractive Multi-Beam Laser Communications Terminal," which is incorporated by reference herein in its entirety.

BACKGROUND OF THE INVENTION

The present invention relates to apparatus and methods for communications. More specifically the present invention relates to an apparatus and method for duplexed multi-beam satellite communications with multiple listeners.

Traditional satellites provide communication links between terrestrial based transmitters and receivers. Traditional satellite linked communications between terrestrial based transmitters and terrestrial based receivers typically provide for the transmitter transmitting one or more signals up to a satellite and the satellite relaying the one or more signals down to the receiver. These traditional satellites may provide passive or active relays. Traditional satellite communication links have traditionally been in the radio frequency ranges with communication rates in the megabit per second range/and the tens of megabit per second range. These communication links have been used extensively for telephone communications, television signal broadcasts, navigation signal broadcasts and the like. Because radio frequency communications have generally been limited to the megabit and tens of megabit per second range, such communications may be of limited use for the next generation of satellites used for military applications, broadband Internet communication or other applications. For example, the next generation of military satellite applications, such as satellite communication with terrestrial listeners, aerial listeners, and spaced based listeners, may use communication data rates in the hundreds of megabit per second range or even the gigabit per second range. Moreover, such applications may use duplexed communications with a relatively large number of listeners or a few listeners that use relatively large amounts of data in their operations.

Accordingly, there is a need for communication terminals that provide high data rate communication links and that are configured to communicate with a number of listeners disposed across a theater of operations.

BRIEF SUMMARY OF THE INVENTION

The present invention provides an apparatus and method for communications. More specifically the present invention provides an apparatus and method for duplexed multi-beam satellite communications with multiple listeners.

According to one embodiment, a communication terminal includes a steering module including a plurality of articulating-turning mirrors configured to selectively direct a corresponding plurality of sets of transmitted beams to sets of listeners; a plurality of static turning mirrors optically coupled to the articulating-turning mirrors, wherein the articulating-turning mirrors are respectively associated with the static turning mirrors; and a refractive common optic optically coupled to the static-turning mirrors; and an optical module including a plurality of transmitter-receiver modules optically coupled to the refractive common optic. The plurality of static turning mirrors are optically downstream from the articulating-turning mirrors, the refractive common optic is optically downstream from the static-turning mirrors, and the plurality of transmitter-receiver modules is optically downstream from the refractive common optic. According to a specific embodiment, the terminal further includes an acquisition tracker. The acquisition tracker is configured to collect a plurality of sets of received beams from the listeners and set an initial tilt of the articulating-turning mirrors based on pointing directions of the received beams. The initial tilt is configured to direct each set of transmitted beams in the opposite pointing direction of an associated set of received beams. The common optic is configured to transmit a plurality of sets of transmitted beams from unique locations in a focal plane of the common optic and to direct each set of transmitted beams to an associated static-turning mirror. According to another specific embodiment, each transmitter-receiver module includes a plurality of receiver-articulation stages; a plurality of receiver fibers respectively associated with the plurality of receiver-articulation stages; a plurality of transmitter-articulation stages; a plurality of transmitter fibers respectively associated with the plurality of transmitter-articulation stages; and tracker-focal plane. According to another specific embodiment, each transmitter-receiver module further includes one fixed receiver fiber configured as a reference for the articulating-turning mirrors. Each set of received beams includes ten or fewer received beams. The sets of listeners include seven sets of listeners and each set of listeners includes at least ten listeners.

According to another embodiment, a satellite includes a steering module including a refractive-common optic configured to collectively focus a plurality of sets of received beams at select locations in a focal plane of the refractive-common optic, and to collectively collimate a plurality of sets of transmitted beams received from the select locations; a plurality of static-turning mirrors optically coupled to the refractive-common optic and configured to respectively transmit the sets of received beams to the refractive-common optic and to respectively receive the sets of transmitted beams from the common optic; and a plurality of articulating-turning-mirrors optically coupled to the plurality of static turning mirrors, respectively, and configured to respectively receive the sets of transmitted beams from the static-turning mirrors and to respectively direct the sets of received beams to the static-turning mirrors; and an optical module optically coupled to the steering module configured to generated the sets of transmitted beams and to receive the sets of received beams. According to a specific embodiment, the optical module includes a plurality of transmitter-receiver modules optically coupled to the common optic. Each transmitter-receiver module is configured to receive one of the sets of transmitted beams and to generate one of the sets of received beams.

According to another embodiment, a satellite includes a first set of reflectors configured to selectively direct sets of transmitted beams to corresponding sets of listeners; a second set of reflectors respectively associated with the first set of reflectors; a refractive optic, wherein the second set of reflectors is configured to optically couple the first set of reflectors and the refractive optic; and a set of transmitter-receiver modules optically coupled to the refractive optic.

Numerous benefits may be achieved using embodiments of the present invention over conventional techniques. For example, a satellite embodiment of the present invention provides high data rate communications with a plurality of listeners, such that the listeners may include terrestrial listeners, aerial listeners, and space based listeners. The satellite embodiment provides for optical communication that may be in the hundreds of megabits per second range and/or in the gigabit per second range. Moreover, the satellite embodiment provides for low cost communications as duplexed communication signals are directed through a common refractive optic. These and other benefits can be found throughout the present specification and more particularly below.

A further understanding of the nature and advantages of the present invention may be realized be reference to the remaining portions of the specification and the drawings.

DETAILED DESCRIPTION OF THE INVENTION

The present invention provides an apparatus and method for communications. More specifically the present invention provides an apparatus and method for duplexed multi-beam satellite communications with multiple listeners.

Across a military theater of operations, the next generation of satellites might communicate with terrestrial listeners, airborne listeners, and space based listeners operating within the theater. The term "listener," as referred to herein, includes devices configured to receive as well as transceiver type devices configured for duplexed communication. Duplexed communication refers to transmission and reception of communication channels that may be simultaneously transmitted and received, for example, by communication terminals and listeners. Terrestrial listeners might include fixed position listeners, such as ground command stations, and might further include mobile listeners that provide communications for solders in the field. Airborne listeners might include traditional aircraft commanded by an on-board pilot, unmanned aerial vehicles (UAVs) or other listeners yet to be developed. Space based listeners might include satellites that may be manned or unmanned. Manned satellites might include space stations, space vehicles and the like. A satellite configured to communicate with such a broad range of listeners might also be configured to communicate in a duplexed format at relatively high data transmission rates, such as in the hundreds of megabit per second range or in the gigabit per second range (referred to herein as the megabit range and the gigabit range, respectively). Embodiments of the present invention are configured to address these problems as well as others.

Figure 1:
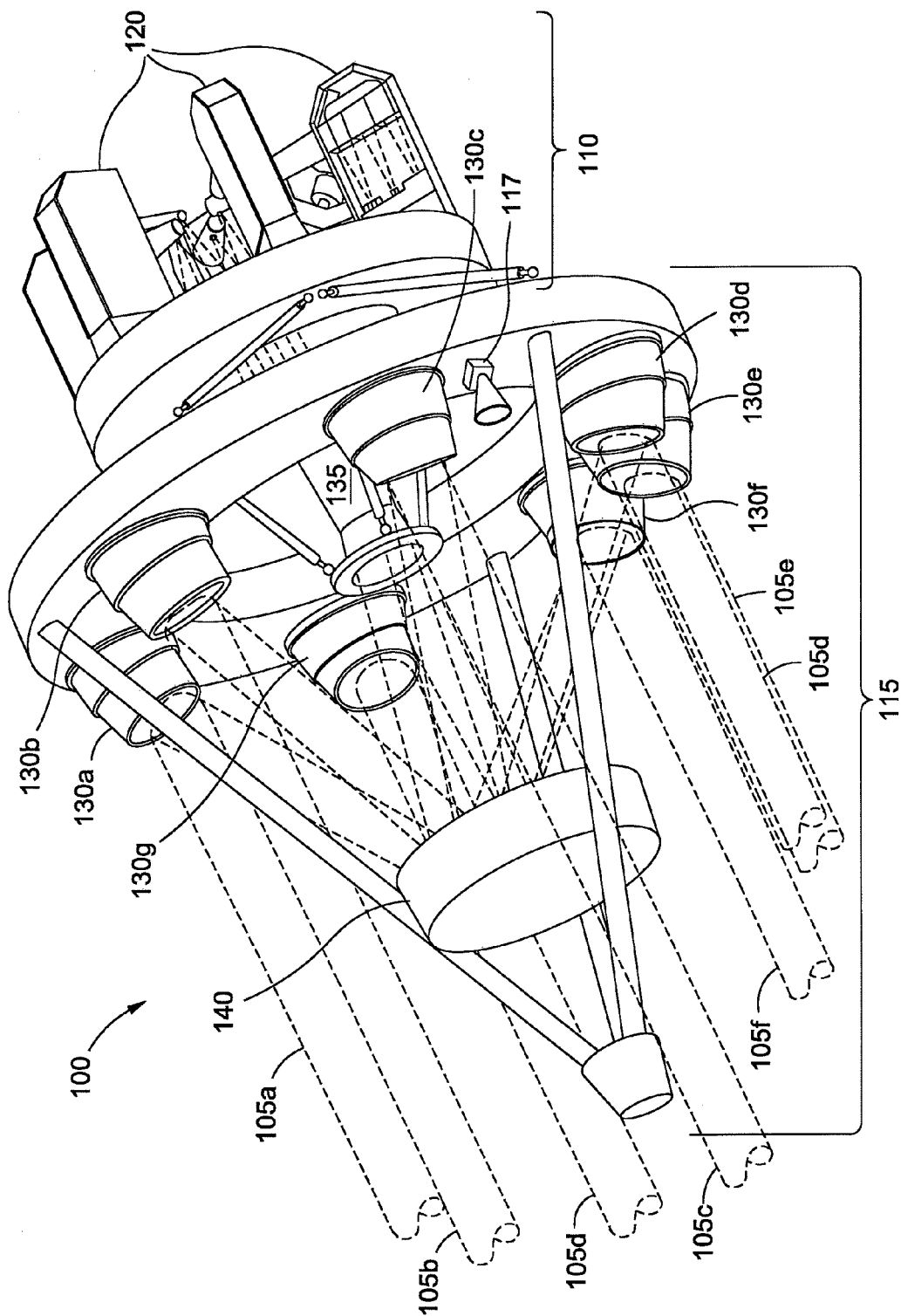
FIG. 1 is a simplified frontal view of a communication terminal according to an embodiment of the present invention.
Figure 2:
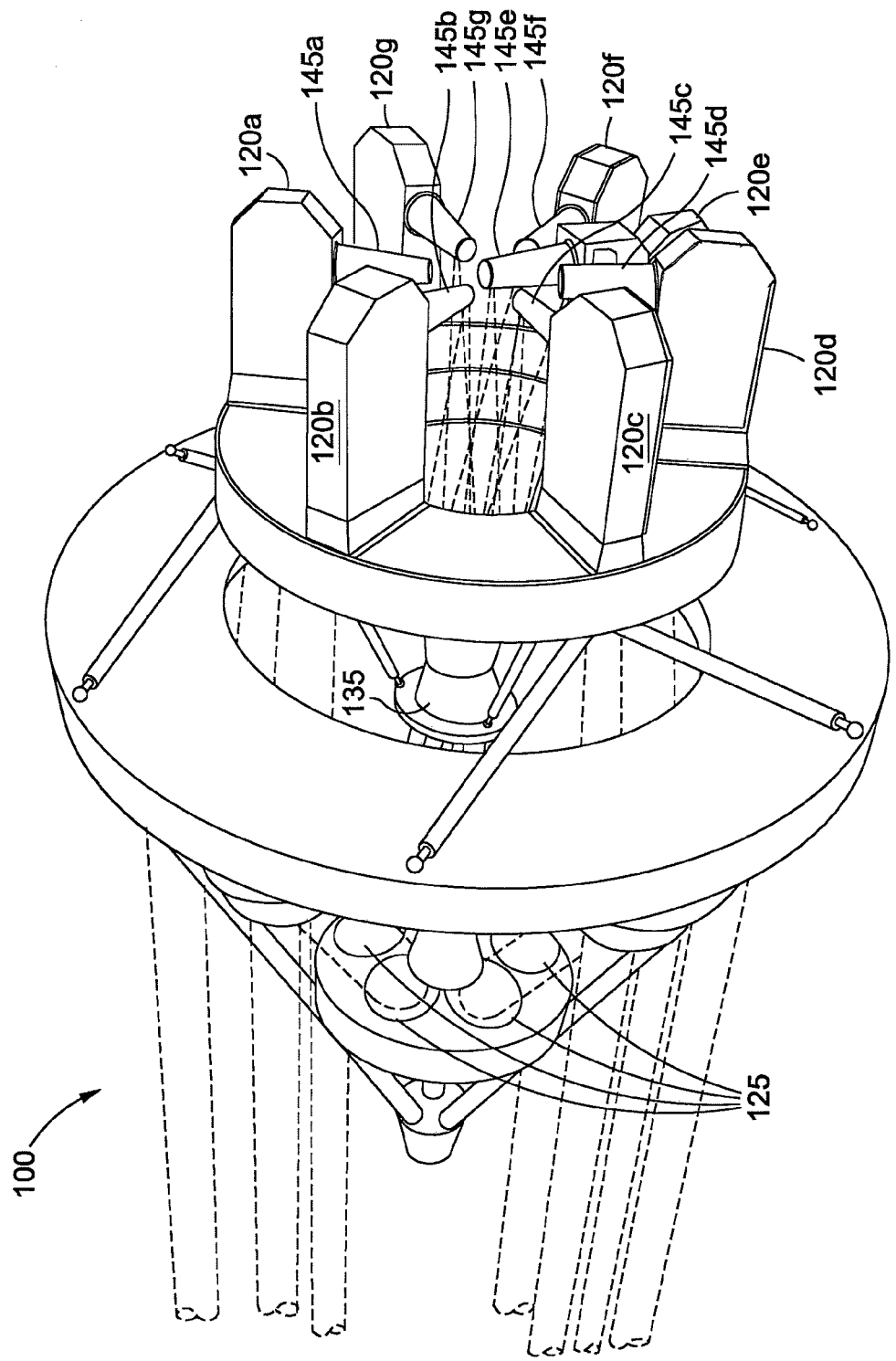
FIG. 2 is a simplified rear view of the communication terminal.

FIGS. 1 and 2 are simplified front and back views, respectively, of a communication terminal 100 according to an embodiment of the present invention. Communication terminal 100 may be a communication satellite configured for space deployment and may be configured to transmit and receive a plurality of communication beams, such as optical communication beams. While communication terminal 100 is generally described herein as being configured to transmit and receive optical beams, the communication terminal may be configured to operate in the near infrared or the ultraviolet. Communication terminal 100 may be configured to transmit and receive a number of beams forming a number of sets of beams. According to one embodiment, communication terminal 100 may be configured to generate and transmit seven sets of beams, wherein each set of beams includes ten transmitted beams. The communication terminal may further be configured to receive seven sets of beams, wherein each set of beams includes ten received beams. In FIG. 1, pairs of transmitted- and received-beam sets are labeled with the reference numbers 105*a*-105*g*. While embodiments of the communication terminal discussed herein are described as transmitting seven sets of ten transmitted beams and receiving seven sets of ten received beams, other embodiments of communication terminals may be configured to transmit more or fewer sets of transmitted beams that may include more or fewer transmitted beams, and to receive more or fewer sets of received beams that may include more or fewer received beams. Therefore, the invention should not be viewed as limited to the particular embodiments that are described herein for purposes of example, but is limited only by the appended claims.

Communication terminal 100 includes an optical module 110, a steering module 115, and an acquisition sensor 117. The seven sets of ten transmitted beams that are transmitted by the communication terminal are generated by optical module 110. More specifically, the sets of transmitted beam are generated by corresponding transmitter-receiver modules 120 that form portions of the optical module. The sets of transmitted beams generated by the transmitter-receiver modules are directed by the transmitter-receiver modules to steering module 115 for transmission. The seven sets of ten received beams that are received by the communication terminal are collected by steering module 115 and by acquisition sensor 117. Steering module 115 transmits the sets of received beams to the optical module, and more specifically, transmits the sets of received beams to the transmitter-receiver modules, in a respective manner.

Acquisition sensor 117 is an independent telescope coupled to the steering module and may be configured to set the initial pointing directions for the transmitted beams based on the pointing directions of the received beams as detected by the acquisition sensor. A "pointing direction," as referred to herein, is the direction of travel of a communication beam. The acquisition sensor may have a relatively wide FoV (e.g., about 25°) to collect, track, and detect the pointing directions of each of the received beams. With the communication terminal at a geosynchronous basing location, the acquisition sensor is capable of viewing the entire Earth disk and portions surrounding space. Other embodiments of the communication terminal may have acquisition sensors with different fields of view based, for example, on the particular application of the embodiments. The acquisition sensor might be the Star Tracker (or a modification or derivative thereof) of the Spitzer Space Telescope of NASA (formerly the Space Infrared Telescope Facility of NASA). According to one embodiment, the acquisition sensor has a tracking accuracy of approximately 5 microradians, although other tracking accuracies may be of use in different embodiments. A detector array may be disposed at the focal plane of the acquisition sensor for tracking the pointing directions of the received beams. The detector array may also be configured for positive identification of a next received beam (e.g., a received beam of a newly transmitting listener) prior to switching to and listening to the next received beam. Positive identification of a next received beam provides optimized switching times, connection speeds, and reduces spoofing. For example, if a listener that is not recognized as an authorized listener is permitted to communicate with the communication terminal (i.e., spoof the communication terminal), communication periods with authorized listeners may be lost, thereby reducing the switching times used to acquire a received beam from an authorized listener, and reducing the connection speed with the authorized listener as communication terminal resources are spent listening to the unauthorized listener. Means for positively identifying a next received beam may include, the use of handshake protocol, providing a key (e.g., a low bandwidth encrypted header), verifying that authorized spectral bands are used and the communication rates are correct. A next received beam may also be authenticated by a determination of the geographical location from which the next received beam is transmitted. For example, if all authorized listeners are in known areas or regions, and a next received beam originates from outside of the known areas and regions, the communication terminal will configure its electronics and optics to communicate with the beam. That is, the next received beam, if unauthorized, will be ignored and one of the articulating-mirror will not be directed to collect the beam. Those of skill in the art will know of other useful identification means. According to one embodiment, the detector array may include an array of charge coupled devices (CCD), complimentary metal oxide (CMOS) devices or the like, for colleting the beams. According to one embodiment, the detector array is 2048×2048 array of InGaAs cells.

According to one embodiment, steering module 115 is configured to direct each set of transmitted beams independently from each of the other sets of transmitted beams. That is, each set of transmitted beams may be independently steered to a select pointing direction. Moreover, from a geosynchronous basing location, each set of transmitted beams may be directed to any location on an Earth hemisphere within the field of regard of the communication terminal. As each of the sets of transmitted beams may be independently steered, each set of transmitted beams may be directed to cover a select area on the Earth's surface, a select region in the Earth's atmosphere, or a select region in space. According to a specific embodiment, each set of transmitted beams may be configured to cover a 720-kilometer diameter area of operation on the Earth's surface. And the seventy transmitted beams may be configured to communication respectively with seventy listeners, such as terrestrial listeners, UAVs, and space based listeners. According to an alternate embodiment, more than one transmitted beam may be transmitted to a listener, for example, if the listener is configured to use data at higher rates than a single transmitted beam might convey.

According to one embodiment, steering module 115 includes a set of static-turning mirrors 125, a set of articulating-turning mirrors 130, and a common optic 135. The set of static-turning mirrors may include, for example, seven static-turning mirrors, and the set of articulating-turning mirrors may include, for example, seven articulating-turning mirrors. The articulating-turning mirrors are respectively associated with the static-turning mirrors. And both the articulating-turning mirrors and the static-turning mirrors are respectively associated with the sets of transmitted beams and with the sets of received beams.

The static-turning mirrors, articulating-turning mirrors, and the common optic may be mounted to a frame 140 that is configured to maintain the integrity of the optical paths through the steering module and optical module. The common optic may be centrally mounted at a rear portion the frame and may be mounted centrally with respect to the articulating-turning mirrors, which may be mounted in ring pattern. Additionally, the static-turning mirrors may be mounted on a forward section of frame 140 and may be disposed about 1 to 2 meters (e.g., about 1.4 meters) from the common optic. Six of the static-turning mirrors may be mounted in a hexagon pattern with one static-turning mirror centrally disposed with respect to the other static-turning mirrors.

Common optic 135 is configured to collectively collimate and direct the sets of transmitted beams received from the transmitter-receiver modules to the static-turning mirrors. Each of the transmitted beams may be focused at unique locations in the focal plane of the common optic to affect collimation of the transmitted beams by the common optic. The common optic may be a refractive optical device having a relatively wide field of view (e.g., about 20°-25°, inclusive) and may have a clear aperture of about 150 millimeters to about 350 millimeters, inclusive.

The static-turning mirrors are configured to receive their respective sets of transmitted beams from the common optic, and to reflect the sets of transmitted beams to their respective articulating-turning mirrors. Each articulating-turning mirror is selectively tiltable and may selectively change the pointing direction of an associated set of transmitted beams. According to one embodiment, the articulating-turning mirrors are configured to articulate in two stages: i) large stroke high bandwidth to control the pointing directions of the transmitted-beams and ii) short stroke high bandwidth adjust pointing directions at a relatively high rate (as compared with the large stroke high bandwidth) to compensate for residual platform vibrations. Initial tilts of the articulating-mirrors may be set by the acquisition sensor based on detected pointing directions of received beams collected by the acquisition sensor.

Being configured to selectively set the pointing directions of the transmitted beams, the communication terminal is able to selectively communicate with different sets of listeners (e.g., seven sets of ten listeners) in select theaters of operation (e.g., seven theaters of operation). The select theaters of operation may be the same or disparate and may include terrestrial, atmospheric, and space based theaters of operation.

For sets of received beams, the optical train described above is simply reversed. Specifically, the sets of received beams are collected by the articulating-turning mirrors, which reflect the received beams to the static-turning mirrors. Reflected from the static-turning mirrors, the sets of received beams pass through the common optic from unique locations. The common optic in turn focuses the sets of received beams to unique locations in the common optic's focal plane. The transmitter-receiver modules collect the received beams for processing (e.g., demodulation and fine detection of the pointing directions). The transmitter-receiver modules are described in further detail below.

As briefly described above, common optic 135 is configured to collectively direct the sets of transmitted beams from unique locations on the focal plane of the common optic to the static-turning mirrors. Specifically, transmitter-receiver modules 120 are configured to focus the transmitted beams to unique locations in the focal plane. More specifically, each set of transmitted beams is directed through the common optic 135 from a unique location in the focal plane by arms 145a-145g. Each arm forms a portion of the transmitter-receiver module to which the arm is coupled. A number of the arms (e.g., six arms) may be approximately symmetrically disposed about a central location, and a number of the arms (e.g., one or more) may be disposed approximately at the central location. See, for example, the positions of arms 145a-145g shown in FIG. 2. As each transmitted beam is focused and transmitted from a unique location in the focal plane, each transmitted beam passes through the common optic from a unique direction and is thus transmitted to the unique locations of the static-turning mirrors.

Figure 3:
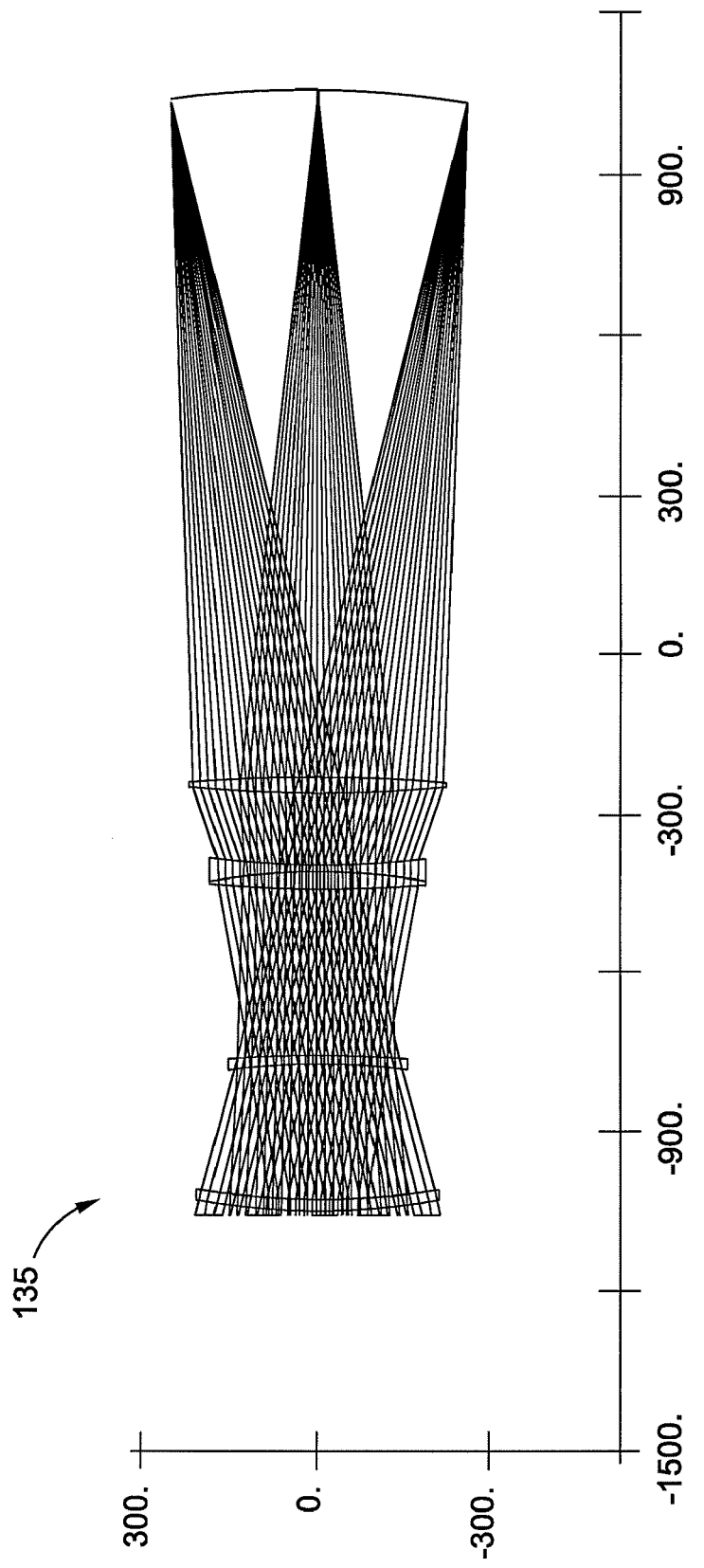
FIG. 3 is a simplified diagram of one embodiment of a common optic having a number of refractive optical elements.

According to one embodiment, common optic 135 is formed from a number of refractive optical elements. FIG. 3 is a simplified diagram of one embodiment of common optic 135 having a number of refractive optical elements. The embodiment of the common optic shown in FIG. 3 may have a primary aperture of about 100-400 millimeters (inclusive), and according to a specific embodiment, the common optic may have a primary aperture of about 300 millimeters. The numerical aperture of the common optic may be approximately f/5 and may have a FoV of approximately 20°-25°, inclusive. The common optic may be optimized for near infrared radiation, such as near infrared radiation having wavelengths from about 1.5 microns to about 1.55 microns, inclusive. Communication terminal 100 may be configured to operate at a single wavelength or multiple wavelengths. For example, each transmitted and received communication beam may be a single wavelength beam, such that each communication beam uses the same wavelength or a different wavelength. Or each transmitted and received communication beams may be carried on a multi-spectral band. Providing communications across multi-spectral bands provides for relatively high bandwidth communications. Other means for increasing bandwidth includes the use of diversely polarized beams, for which differently polarizations transmitted and received communication beams might carry different communication channels. Polarizing beam splitters, discussed below, may be configured to facilitate communications using diversely polarized communication beams. While the embodiment of common optic 135 shown is FIG. 3 includes color correction elements, other embodiments (e.g., embodiments configured for approximately monochromatic or narrow spectral band communications) of the common optic may forgo this option. Moreover, while the common optic is shown as including five refractive elements (i.e., lenses), other common optic embodiments may include more or fewer lenses. The x and y axes shown in FIG. 3 represent scales in millimeters.

Figure 4:
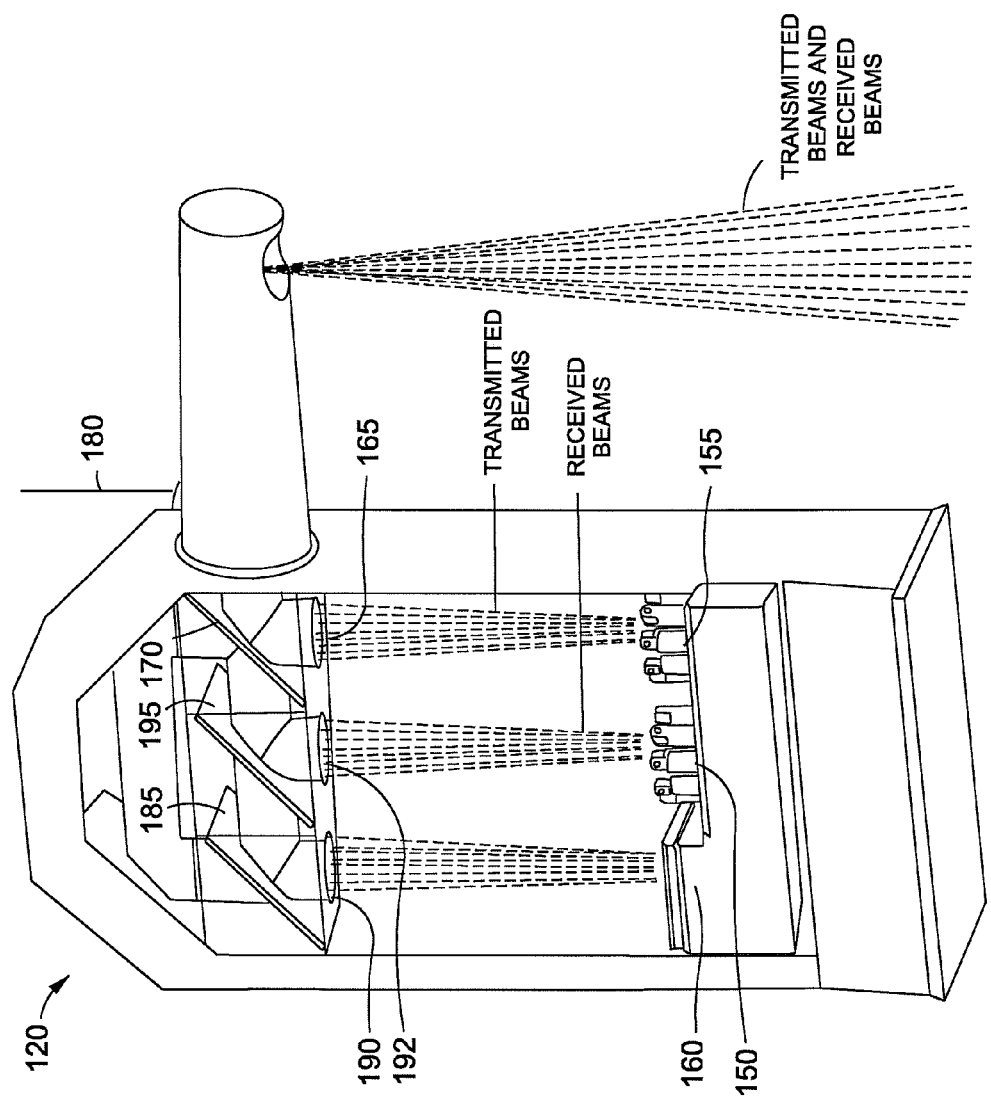
FIG. 4 is a further detailed view of a transmitter-receiver module according to an embodiment of the present invention.
Figure 5:
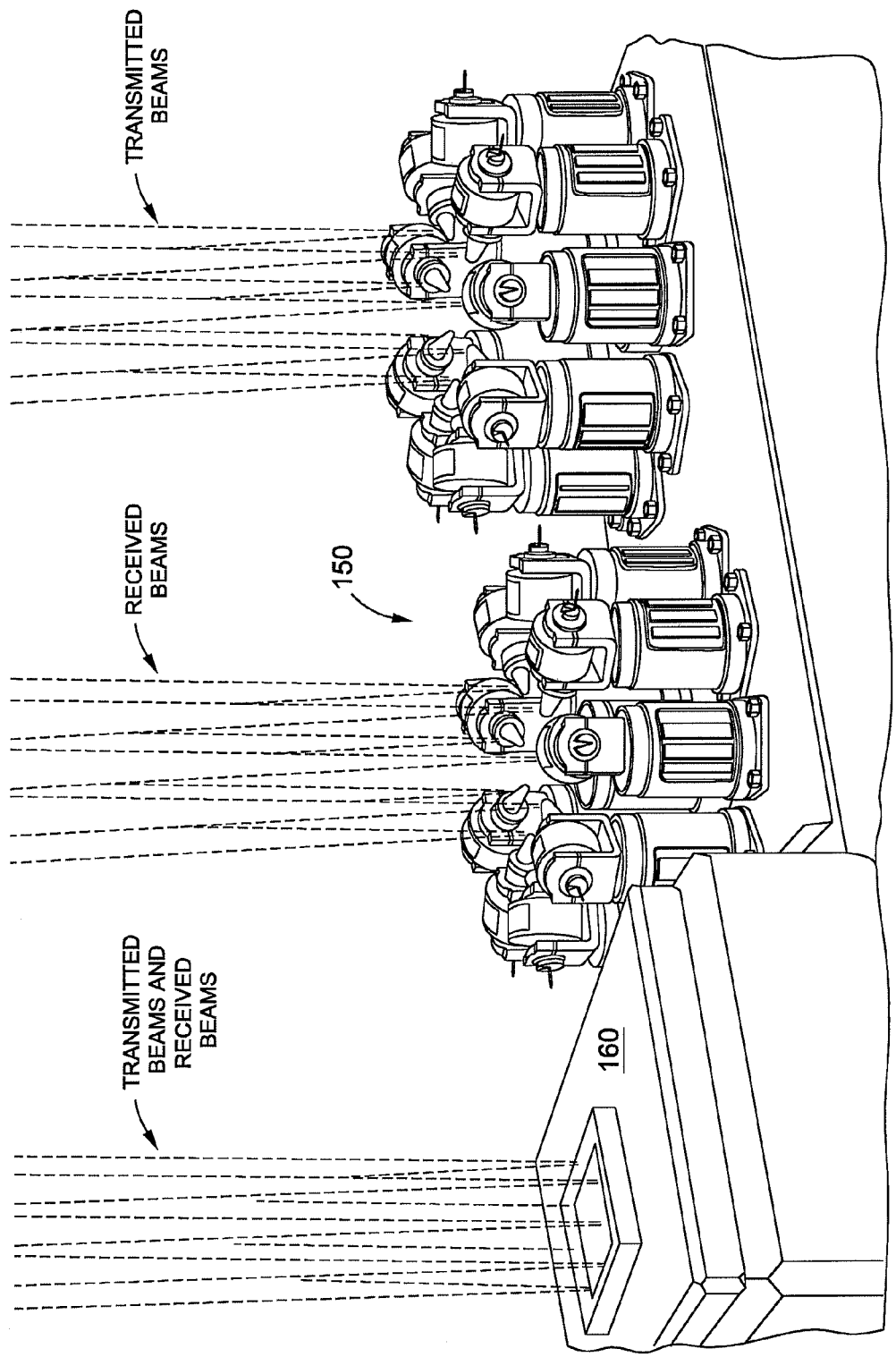
FIG. 5 is a further detail view of the set of receiver-articulation stages, the set of transmitter-articulation stages, and the tracker-focal plane according to one embodiment of the present invention.
Figure 7:
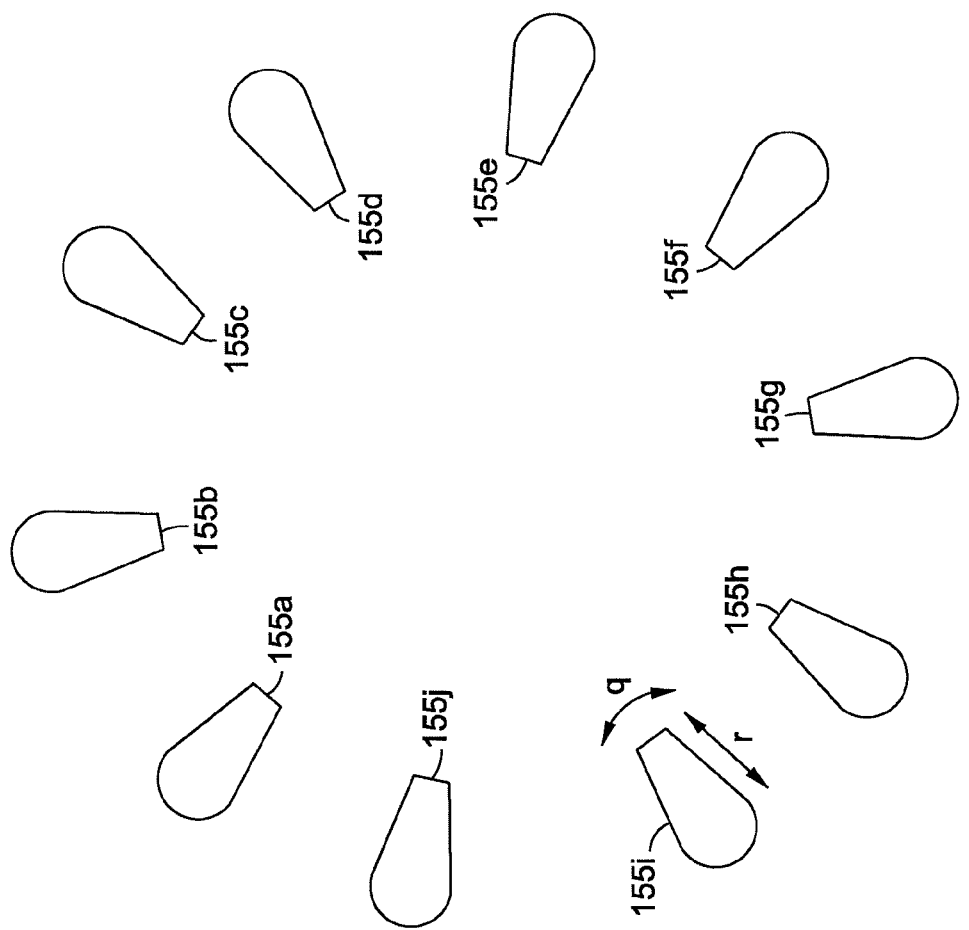
FIG. 7 is a simplified top view of the transmitter-articulation stages according to an embodiment of the present invention.

Optical module 110 is presently described in detail. As briefly mentioned above, optical module 110 may include seven transmitter-receiver modules 120a-120g. FIG. 4 shows a further detailed view of a single transmitter-receiver module 120 according to one embodiment. Each transmitter-receiver module may be configured to generate one of the seven sets of ten transmitted beams and receive one of the seven sets of ten received beams. It should be understood, that at any given time, each transmitter-receiver module may generate fewer than ten beams and may receive fewer than ten beams. For example, a transmission channel might not be in use as a listener is not available, or the listener may be in a quite mode and might not be transmitting or receiving. Each transmitter-receiver module may include a set of receiver-articulation stages 150, a set of transmitter-articulation stages 155, a set of routing optics 140, and a tracker-focal plane 160. FIG. 5 is a further detailed view of the set of receiver-articulation stages 150, the set of transmitter-articulation stages 155, and the tracker-focal plane 160, and FIG. 7 is a further detailed view of the upper portion of the transmitter-receiver module. According to one embodiment, the set of receiver-articulation stages 150 includes nine receiver-articulation stages. According to another embodiment, the set of transmitter-articulation stages includes ten transmitter-articulation stages. The receiver- and transmitter-articulation stages are configured to control the locations of fiber optic cables (not shown) configured to receive and transmit the communication beams, respectively.

Figure 6:
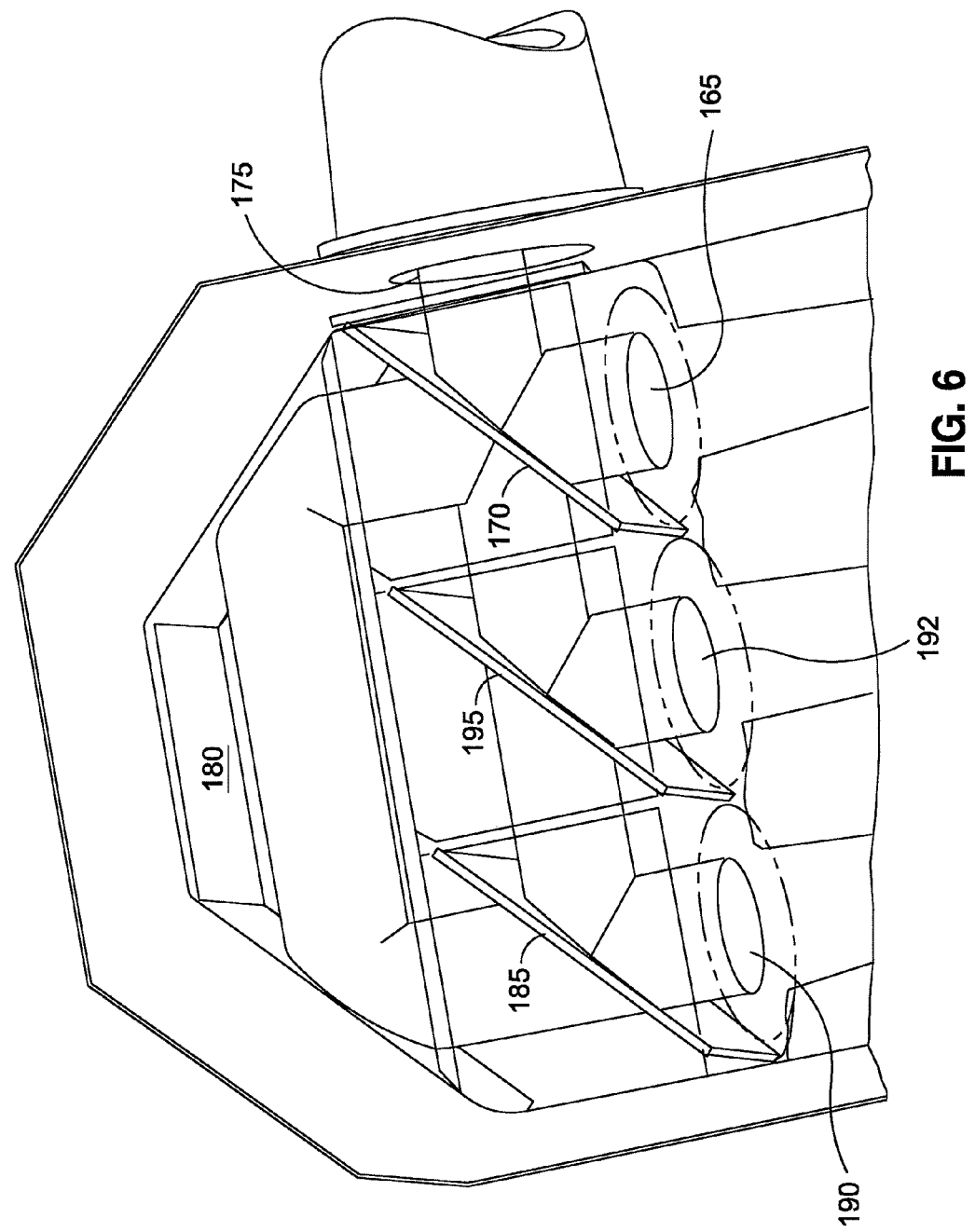
FIG. 6 is a further detailed view of the upper portion of a transmitter-receiver module according to an embodiment of the present invention.

The description that follows will primarily be with respect to a single transmitter-receiver module, it being understood, that each of the transmitter-receiver modules may be similarly configured. Referring again to FIG. 4, the transmitted beams may be generated by one or more lasers (not shown) that are optically coupled to the transmitter-fiber-optic cables (or transmitter fibers). According to one embodiment, the translation-articulation stages are configured to translate the transmitting tips of the transmitter fibers in a transmission plane that is common to the transmitting tips. The tips of the transmitter fibers may be moved in the transmission plane along a radius r and/or through an angle θ (see FIG. 7) by the transmitter-articulation stages. Each transmitter fiber may have a field of view (FoV) of about 20 milliradians; however, other useful fields of view may be used. Additionally, the transmitter fibers may have a diameter of about 10 microns and may be single mode fibers. Subsequent to transmission of the transmitted beams by the transmitter fibers, the transmitted beams may be collimated by a lens 165. Subsequent to collimation, the collimated beams are split by a beam splitter 170 (e.g., a cube beam splitter having a polarization splitting interface) that directs a first portion of each beam's energy (e.g., less than about one percent of beam energy) to the tracker-focal plane 160 and directs a second portion of each beam's energy through a lens 175 (see FIG. 6). With respect to the plane of the page, the first portions of the transmitted beams travel upward from beam splitter 170 and the second portions of the beams travel to the right. The transmitted beam portions directed through lens 175 are focused by the lens at the focal plane of common optic 135. As discussed above, from the focal plane each set of transmitted beams is directed through the common optic from unique locations in the focal plane.

The first portions of the transmitted beams are directed to the tracker-focal plane by a steering device 180, which may include a pair of optical flats, a rooftop prism or the like. After passing through steering device 180, the beams are directed through a second beam splitter 185 and are focused by lens 190 onto to the tracker-focal plane. The tracker-focal plane is configured to track the pointing direction of the ten transmitted beams. Additionally, the tracker-focal plane is configured to control the transmitter-articulation stages to direct the transmitted beams in the reverse directions of the received beams that are received by the tracker-focal plane (acquisition of the received beams by the tracker-focal plane is described below). The tracker-focal plane may include a detector array for collecting the beams and one or more processors for calculating pointing directions of the transmitted beams and the received beams. The detector array may include an array of charge coupled devices (CCD), complimentary metal oxide (CMOS) devices or the like, for collating the beams. According to one embodiment, the detector array is a 2048×2048 array of InGaAs cells. According to one embodiment, the tracker-focal plane may have a tracking accuracy of less than or equal to about 500 nanoradians.

As briefly mentioned above, in addition to detecting the pointing direction of the transmitted beams, the tracker-focal plane is also configured to determine the pointing directions of the ten received beams that are received by the transmitter-receiver module. Also, as mentioned briefly above, the received beams are collected by the steering module 115 and steered by the steering module to the transmitter-receiver modules (described above in detail). Each received beam may be associated with one of the transmitted beams via a given listener. That is, the transmitted beam directed to the given listener, and the received beam transmitted from the given listener, are said to be associated. Dependent on the detected pointing direction of the received beam, the received beam's associated transmitted beam is transmitted in the return direction of the received beam (i.e., pointing direction that is opposite the pointing direction of the received beam). Specifically, by tracking the pointing direction of the received beam, the tracker-focal plane may use the detected pointing-direction information of the received beams to "finely control" the transmitter-articulation stage, and hence, finely control the pointing directions of the transmitted beams, such that the pointing directions of the transmitted beam are the return directions of their respective received beams. "Rough control" of the pointing direction of the transmitted beams may be controlled by the steering module as discussed above. Fine control, as referred to herein, includes an amount of control that is of higher precision than an amount of precision of rough control.

According to one embodiment, the transmitted beams and the received beams are directed to the disparate locations on the tracker-focal plane. Directing the beams to disparate locations provides for relatively high resolution of the detected pointing directions of the beams. To effect beam focus at different locations on the tracker-focal plane, a transparent (e.g., glass) wedge may be inserted in the return path of the transmitted beams to the tracker-focal plane to offset the transmitted beams by a known amount from the received beams. Alternatively, one of the reflection surfaces (e.g., the last optical flat in the optical train) of steering device 180 may be disposed to affect the known amount of offset.

Figure 8:
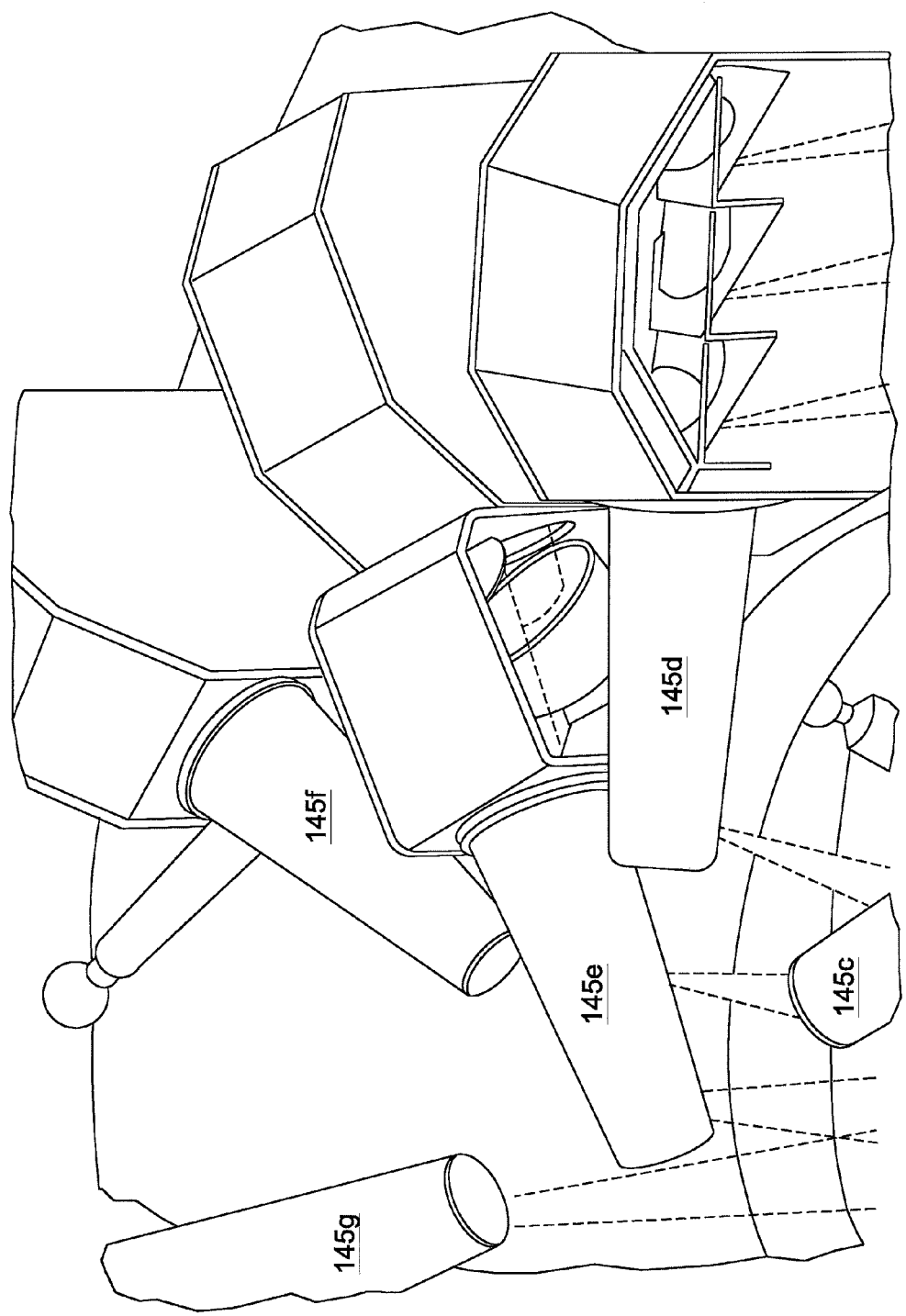
FIG. 8 is a further detailed rear view of the communication terminal.

Referring again to FIG. 2, sets of received beams transmitted from the steering module to the transmitter-receiver modules are collected by the transmitter-receiver module's collection arms 145. Referring again to transmitter-receiver module shown in FIG. 4, the collector arm directs the set of received beams to lens 175, which collimates the received beams. The collector arm might include one or more flat fold mirrors configured to direct the received beams to lens 175. For example, one of the seven collector arms that is approximately centrally disposed, such as collector arm 145*e*, shown in FIGS. 2 and 8, may include a number of flat fold mirrors to direct received beams along the collector arm to a lens 175, whereas the other arms might include a single mirror to direct received beams to lens 175. Referring again to FIGS. 4 and 6, lens 175 is configured to collimate the set of received beams. The set of received beams is transmitted by beam splitter 170 to a beam splitter 195. Beam splitter 195 may direct a first portion of each received beam's energy (e.g., less than about one percent of the received beam's energy) to beam splitter 185 and may direct a second portion of the received beam's energy to receiver-articulation stages 150. The portions of the received beams directed through beam splitter 185 are focused by lens 190 onto the tracker-focal plane 160, and the portions of the received beams directed through beam splitter lens 190 are focused by lens 192 onto the receiver-articulation stages 150.

As described briefly above, the tracker-focal plane is configured to track the pointing directions of the received beams and provide fine control of the pointing direction of the transmitted beams. In addition to controlling the pointing direction of the transmitted beams, the tracker-focal plane is configured to control the receiver-articulation stages to optimize collection of received beam energy by a set of receiver-fiber-optic cables (or receiver fibers). Specifically, each receiver fiber (e.g., nine of the ten receiver fibers) associated with a receiver-articulation stage may be swept along a radius r and through an angle θ to locate the receiver fibers in the optical paths of the received beams. According to one embodiment, one receiver fiber is fixed in the receiver plane (i.e., plane of the receiver tips of the receiver fibers). The pointing direction of the fixed received beam may be used as pointing reference for the articulating-turning mirrors.

Figure 9:
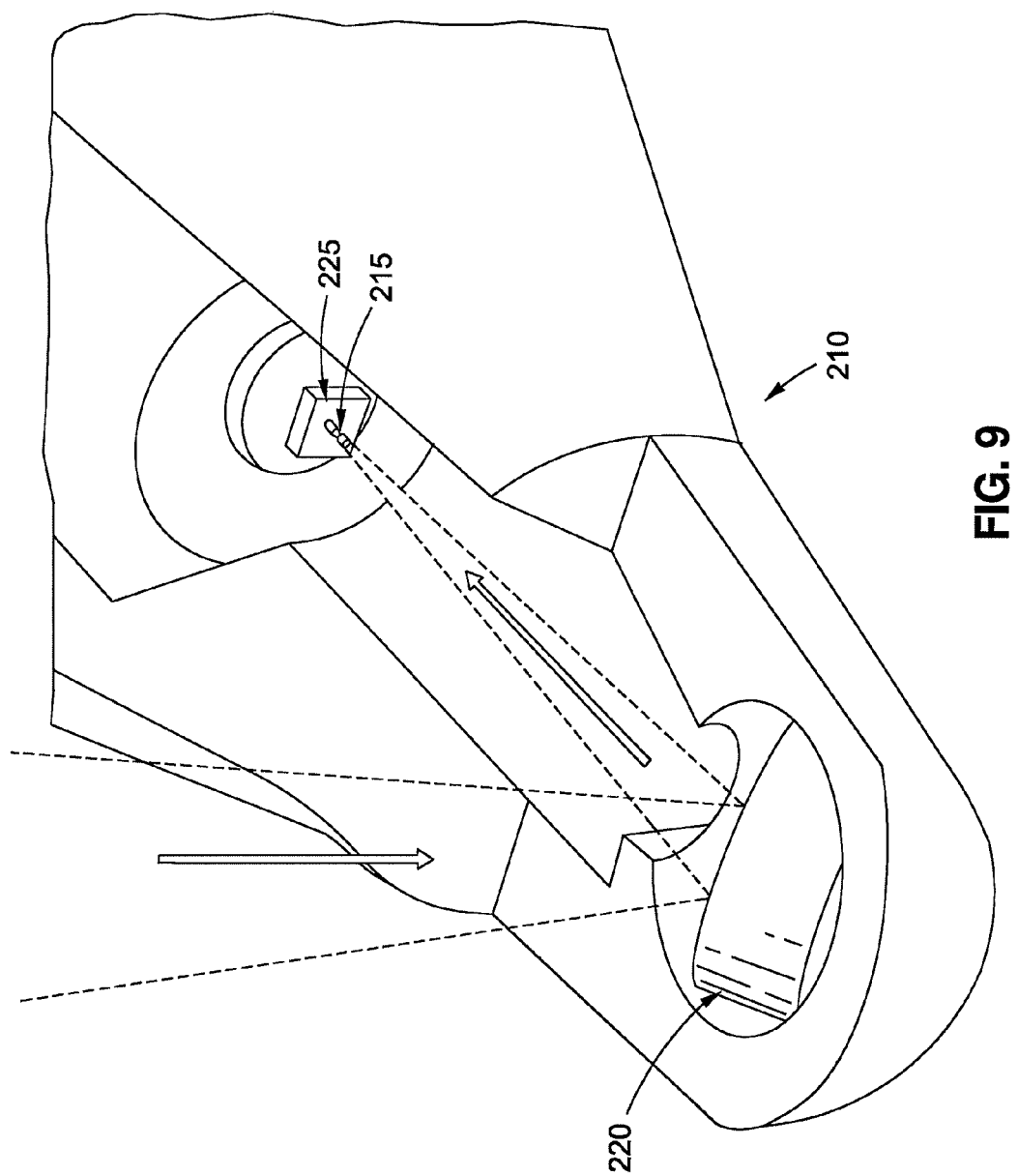
FIG. 9 is a further detailed view of a control arm of a receiver-articulation stage according to an embodiment of the present invention.

FIG. 9 is a further detailed view of a control arm 210 of a receiver-articulation stage that may be swept through r and θ to position the receiver fiber 215 in the optical path of the received beam. Both the transmitter fibers, and the receiver fibers, may be single mode fiber having, for example, a diameter of about 10 microns. The control arm may include a flat fold mirror 220 configured to direct the received beam to the receiver fiber. According to one embodiment, the flat fold mirror has a diameter of approximately 0.25 millimeters.

According to one embodiment, each control arm of each receiver-articulation stage includes an integrated quadrant detector 225 disposed near the tip of its associated receiver fiber 215. The quadrant detector is configured to detect unevenly distributed radiation about the tip, and based on the unevenly-distributed radiation, refine the location of the tip of the fiber optic cable to optimize beam energy collected by the fiber optic cable. Each quadrant detector may have an approximately 60° FoV, although of FoVs are of use according to other embodiments of the present invention. Quadrant detectors are well understood by those of skill in the art and will not be described in further detail.

The above-described arrangements of apparatus and methods are merely illustrative of applications of the principles of this invention and many other embodiments and modifications may be made without departing from the spirit and scope of the invention as defined in the claims. For example, while the communication terminal has generally been described as a satellite system configured for space deployment, the communication terminal may be used in other environments, such as terrestrial environments. Further, while embodiments of the communication terminal have been described as being configured to transmit seven sets of ten beams and receive seven sets of ten beams, this is not necessary as communication terminals according to embodiments of the present invention may be configured to transmit and receive more or fewer sets of beams and more or fewer beams per set of beams. Therefore, the scope of the invention should be determined not with reference to the above description, but instead should be determined with reference to the appended claims along with their full scope of equivalents.

What is claimed is:

1. A communication terminal comprising:
   a steering module including:
   a plurality of articulating-turning mirrors configured to selectively direct a corresponding plurality of sets of transmitted beams to sets of listeners;
   a plurality of static turning mirrors optically coupled to the articulating-turning mirrors, wherein the articulating-turning mirrors are respectively associated with the static turning mirrors; and a refractive common optic optically coupled to the static-turning mirrors; and
an optical module including a plurality of transmitter-receiver modules optically coupled to the refractive common optic.

2. The terminal of claim 1, wherein:
the plurality of static turning mirrors are optically downstream from the articulating-turning mirrors,
the refractive common optic is optically downstream from the static-turning mirrors, and
the plurality of transmitter-receiver modules is optically downstream from the refractive common optic.

3. The terminal of claim 1, further comprising an acquisition sensor.

4. The terminal of claim 3, wherein the acquisition sensor is configured to collect a plurality of sets of received beams from the listeners and set an initial tilt of the articulating-turning mirrors based on pointing directions of the received beams.

5. The terminal of claim 4, wherein the initial tilt is configured to direct each set of transmitted beams in the opposite pointing direction of an associated set of received beams.

6. The terminal of claim 1, wherein the common optic is configured to transmit a plurality of sets of transmitted beams from unique locations in a focal plane of the common optic and to direct each set of transmitted beams to an associated static-turning mirror.

7. The terminal of claim 1, wherein each transmitter-receiver module includes:
a plurality of receiver-articulation stages;
a plurality of receiver fibers respectively associated with the plurality of receiver-articulation stages;
a plurality of transmitter-articulation stages;
a plurality of transmitter fibers respectively associated with the plurality of transmitter-articulation stages; and
tracker-focal plane.

8. The terminal of claim 7, wherein each transmitter-receiver module further includes one fixed receiver fiber configured as a reference for the articulating-turning mirrors.

9. The terminal of claim 7, wherein the tracker-focal plane is configured to receive a set of received beams and a set of transmitted beams and to determine the pointing directions of the received beams and the transmitted beams.

10. The terminal of claim 9, wherein the tracker-focal plane is further configured to control the transmitter-articulation stages to direct the transmitted beams in the opposite pointing directions of associated received beams.

11. The terminal of claim 7, wherein each transmitter-receiver module further includes a steering module configured to direct a first portion of each transmitted beam to the tracker focal plane and focus a second portion of each transmitted beam on a focal plane of the refractive common optic.

12. The terminal of claim 11, wherein the steering module of each transmitter-receiver module is further configured to focus a first portion of the received beams on the focal-plane tracker and focus each received beam onto an associated receiver fiber.

13. The terminal of claim 1, wherein the plurality of articulating-turning mirrors includes seven articulating-turning mirrors.

14. The terminal of claim 1, wherein the plurality of static-turning mirrors includes seven static-turning mirrors.

15. The terminal of claim 1, wherein the refractive common optic is configured to collectively direct sets of transmitted beams from unique locations in a focal plane of the common optic to the static-turning mirrors.

16. The terminal of claim 15, wherein the static-turning mirrors and the articulating-turning mirrors are respectively associated with the sets of transmitted beams.

17. The terminal of claim 15, wherein each set of transmitted beams includes ten or fewer transmitted beams.

18. The terminal of claim 15, wherein the articulating-turning mirrors are configured to selectively direct each set of transmitted beams to respective sets of listeners.

19. The terminal of claim 18, wherein each set of listeners includes at least one of a set of terrestrial listeners, a set of aerial listeners, and a set of space based listeners.

20. The terminal of claim 1, wherein the refractive common optic is configured to collectively direct sets of received beams from the static-turning mirrors to unique locations in a focal plane of the common optic.

21. The terminal of claim 20, wherein the static-turning mirrors and the articulating-turning mirrors are respectively associated with the sets of received beams.

22. The terminal of claim 20, wherein the articulating-turning mirrors are configured to reflect the received beams to the static-turning mirrors.

23. The terminal of claim 20, wherein each set of received beams includes ten or fewer received beams.

24. The terminal of claim 1, wherein the sets of listeners include seven sets of listeners.

25. The terminal of claim 24, wherein each set of listeners includes ten listeners.

26. A satellite comprising:
a steering module including:
a refractive-common optic configured to collectively focus a plurality of sets of received beams at select locations in a focal plane of the refractive-common optic, and to collectively collimate a plurality of sets of transmitted beams received from the select locations;
a plurality of static-turning mirrors optically coupled to the refractive-common optic and configured to respectively transmit the sets of received beams to the refractive-common optic and to respectively receive the sets of transmitted beams from the common optic; and
a plurality of articulating-turning mirrors optically coupled to the plurality of static turning mirrors, respectively, and configured to respectively receive the sets of transmitted beams from the static-turning mirrors and to respectively direct the sets of received beams to the static-turning mirrors; and
an optical module optically coupled to the steering module configured to generate the sets of transmitted beams and to receive the sets of received beams.

27. The terminal of claim 1, wherein each articulating turning-mirror from the plurality of articulating-turning mirrors is configured to be selectively steered, independent of the remaining articulating turning-mirrors, to direct a corresponding set of transmitted beams in a selected pointing direction.

28. The satellite of claim 26, wherein the optical module includes a plurality of transmitter-receiver modules optically coupled to the common optic.

29. The satellite of claim 28, wherein each transmitter-receiver module is configured to receive one of the sets of received beams and to generate one of the sets of transmitted beams.

30. The satellite of claim 28, further comprising an acquisition sensor.

31. The satellite of claim 30, wherein the acquisition sensor is configured to collect the sets of received beams from listeners and set an initial tilt of the articulating-turning mirrors based on pointing directions of the received beams.

32. A satellite comprising:
- a first set of reflectors configured to selectively direct sets of transmitted beams to corresponding sets of listeners;
- a second set of reflectors respectively associated with the first set of reflectors;
- a refractive optic, wherein the second set of reflectors is configured to optically couple the first set of reflectors and the refractive optic; and
- a set of transmitter-receiver modules optically coupled to the refractive optic.

33. The satellite of claim 32, wherein the set of transmitter-receiver modules are respectively configured to generate the sets of transmitted beams.

34. The satellite of claim 32, wherein:
- the second set of reflectors is optically downstream from the first set of reflectors,
- the refractive optic is optically downstream from the second set of reflectors, and
- the set of transmitter-receiver modules is optically downstream from the refractive optic.

35. The satellite of claim 32, further comprising an acquisition sensor.

36. The satellite of claim 35, wherein the acquisition sensor is configured to collect a plurality of sets of received beams from the listeners and set an initial tilt of the first set of reflectors based on pointing directions of the received beams.

37. The satellite of claim 36, wherein the initial tilt is configured to direct each set of transmitted beams in an opposite pointing direction of an associated set of received beams.

* * * * *